Jan. 31, 1939.   A. E. HOPKINS   2,145,419
SPRING ANCHOR
Filed June 10, 1936

Inventor
Alva Elmer Hopkins
By Charles L. Reynolds
Attorney

Patented Jan. 31, 1939

2,145,419

UNITED STATES PATENT OFFICE 2,145,419

SPRING ANCHOR

Alva Elmer Hopkins, Tacoma, Wash.

Application June 10, 1936, Serial No. 84,463

6 Claims. (Cl. 267—1)

My invention relates to means to secure the ends of extension coil springs or like coiled members, for instance, coiled electric resistance elements.

Coil springs of various sizes of coil and of wire, and of varying strengths and lengths are employed in various parts of machines. It is customary to secure the ends of such coils by forming loops at the ends of the spring, and engaging these loops on hooks or lugs, or by screws threaded into the members to be connected by the spring. This necessitates forming the spring to substantially the exact length, and in addition requires separate operations to form the loops at the ends of the springs. Now if such a spring or the loop at an end thereof breaks off, it is necessary to supply a new spring, thus formed and cut to length, or to sacrifice some of the resilience or to increase the strength of the spring by forming a loop from the coiled portion of the spring for securement to the member from which it has broken loose. The latter, if the spring is large, may be a difficult operation, due to the strength and size of the wire, or if the spring is small it becomes a tedious and difficult operation because of the small size of the wire, coil and loop.

It is an object of the present invention to provide a spring anchor with which the coils of a spring may be engaged by simple movement of the spring in a direction transverse to its length, which requires no loops formed at the ends of the coil, which does not require that the spring be formed to exact length, which is suited for use with all sizes of coil and wire, and which can be engaged in the event of breakage without the necessity of performing any operation on the spring, such as forming a loop on the end of the coil.

It is a further object to provide a spring anchor of the character indicated, which has incorporated in it a means to engage the spring and prevent unintentional disengagement thereof, and which will permit disengagement of the spring only by a tilting action of the free end of the spring with relation to the anchor, a type of movement not likely to occur accidentally, and which therefore provides an anchorage and lock which is secure against accidental disengagement under all conditions of use, but which can be readily disengaged when necessary.

It is a further object to provide a spring anchor having the above characteristics, which shall be simple in construction, readily manufactured, and which can be made in the varied styles necessary to fit varying requirements of strength, size of coil, size of wire, and securement to the members to be connected by the spring.

As an example of the uses to which the invention can be put I may mention typesetting machines, wherein numerous banks of tiny springs, nearly one hundred in each bank, are employed in connection with the key rods or magazines. These frequently break, and it becomes necessary to effect repairs, either by forming a new loop at the end of the spring or by putting in a new spring. This takes time and ties up the machine, and sometimes extra springs will not be immediately available. With anchorages such as those of my invention it will be a simple matter to connect each end of the spring, and if the spring breaks, to disengage it, the spring being formed of excess length, cut from long coils, and to reengage each end with such an anchorage, the entire operation being performed in a few seconds, scarcely interrupting the operation of the machine.

My invention comprises the novel spring anchor, shown in the accompanying drawing, and which will be hereinafter more particularly described and defined.

In the accompanying drawing I have shown the principles of my invention incorporated in various illustrative forms.

Figure 2:
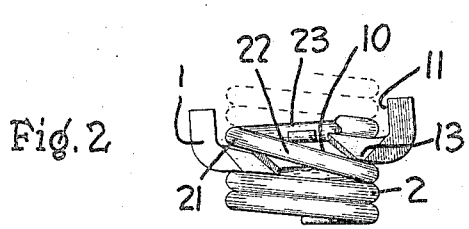
Figure 2 is an elevation, the point of view being illustrated by the line 2—2 in Figure 1.
Figure 4:
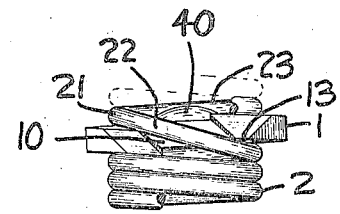
Figure 4 is an elevation on the line 4—4 of Figure 3.
Figure 7:
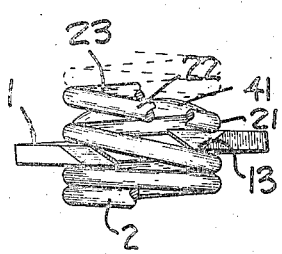
Figure 7 is an elevation on the line 7—7 of Figure 5.

Essentially the invention comprises a plate 1, suitably formed for securement to or as a part of a member to be engaged by or acted upon by the spring 2, and with which the spring is engageable by bodily movement transversely of the direction of its length. Thus in engaging, the edge 13 of the plate 1 separates the coils of the spring so that a part thereof lies below the plate and the remainder above it, assuming the plate to be held in a horizontal plane. Assuming a particular coil 21 to be that portion of the spring 2 which is engaged with the plate 1, it is pushed on until its trailing or rear portion 22 has a part lying at one side of the plate and a part lying at the other side, and either this trailing portion 22 or the advancing or leading portion 23 of this coil 21 is engaged with some part of the plate to stop its forward movement. Preferably the plate 1 is bifurcated, as indicated at 19, and the edges of the bifurcations may be beveled, as seen in Figures 2, 4 and 7, for example, to separate the coils of the spring as little as possible, the plate being comparatively thin. The forward or leading edge of the rear portion 22 may engage the bottom of the slot thus formed, or the forward edge of the leading portion 23 may engage a stop on the plate, as for example a shoulder 11.

When the coils reach this position a member on the plate engages beneath a rear or trailing edge of the coil 21 to prevent unintentional reverse movement thereof. Thus a stop 4 may be formed as a projection above the surface of the plate, though preferably inclined so that the leading portion 23 of the coil will ride over it during engagement, but when fully engaged the portion 23 drops down over the abrupt projection or stop 4, and this stop, engaging the rear edge of the leading portion 23, prevents unintentional reverse movement of the coil. It has been found in practice that any attempt to move the spring bodily in the reverse or disengaging direction will deform the spring before it is disengaged from the projection 4. However, if it is necessary to disengage the spring from the anchor, this can be done by merely tilting the free end of the coil above the projection 4 in the disengaging direction. This lifts the engaged portion 23 above the projection 4 and the spring immediately slides off the plate 1.

While the projection 4 has been shown extending above the surface of the plate 1 at one side only, it might be duplicated and extend in the opposite direction also. In such a case, it would be necessary to bend the spring at both sides of the plate to disengage it, instead of merely the free end, as described above.

The shoulders 11 or the engagement of the trailing portion 22 of the coil with the edges of the slot 19, or both, may be relied upon to prevent bodily movement of the coil in a direction transverse to the direction of the engaging or disengaging movement.

Figure 1:
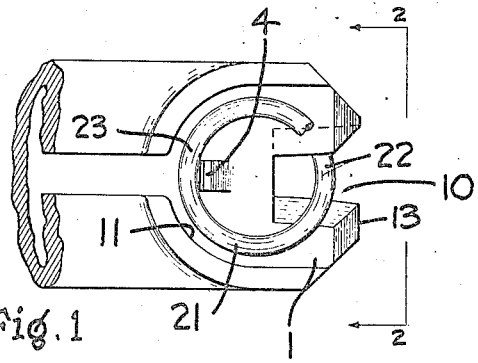
Figure 1 is a plan view of one form of the invention, showing a spring engaged therewith.
Figure 3:
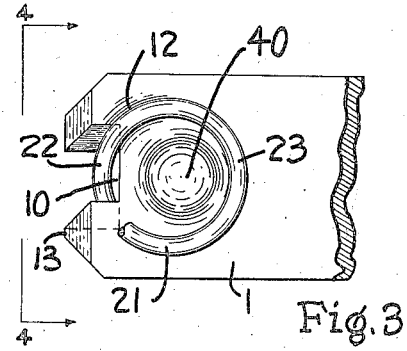
Figure 3 is a plan view of a different form.

Much the same effect is obtained by the rounded projection 40 illustrated in Figure 3. The separated coils tend to close and thus hold the forward or leading portion 23 close to the surface of the plate 1, and prevent unintentional disengagement of the coil 21 from the rounded projection 40. To prevent any greater separation of the coil then is essential, the surfaces of the plate may be grooved, as indicated at 12, to form channels for the accommodation of the coil 21.

Figure 5:
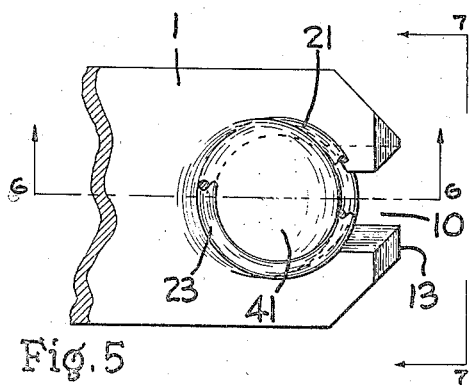
Figure 5 is a plan view of a further form.
Figure 6:
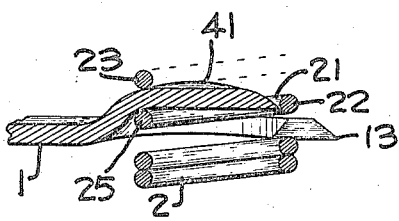
Figure 6 is a section through the same on the line 6—6 of Figure 5.

In Figure 5 the projection 41 is shown as of about the same size as the coil itself, and its edge is separated from the plate as an extension of the slot 19, the coil 21 being received in the space between the edge of the projection 41 and the plate 1. The leading portion 23 of the coil, riding past the high point of the projection 41, serves to hold the coil in engagement with the plate, as does also the engagement of the coil 21 in the narrowing slit between the edge of the projection 41 and the plate 1, and the same engagement serves to prevent transverse bodily movement of the spring in a direction at right angles to its movement in engagement. The engagement of the coil 25 immediately beneath the coil 23 with the under side of the upraised projection 41 serves to limit the advancing movement of the coil.

Should it be desired to prevent disengagement of the spring, the end of one of the bifurcations may be turned up to engage behind the spring, or any similar expedient may be employed.

Various other arrangements might be employed, but these will serve to illustrate the principles of my invention, and these principles are more particularly pointed out in the following claims.

What I claim as my invention is:

1. An anchor for coil springs comprising a plate formed at one edge for securement to a support, and bifurcated at another edge to be moved transversely of the spring coil to a position between the coils, one furcation being disposed to engage below and the other above any given coil of the spring, and means on said plate engageable with the spring by movement transversely of the coils, to prevent unintentional disengagement of the coil, and disengageable only by tilting the coil at an angle to the plane of the plate.

2. An anchor for a free end of an extension coil spring, comprising a plate formed for securement to a support, and bifurcated at an edge to receive in the slot thus defined one coil of the spring, when pushed transversely of the spring's axis towards the plate, whereby such coil lies below one furcation and above the other, and further coils, towards the free end, continue as extensions of such coil, above the second furcation, and means integral with said plate engageable with a rear edge of such coil, as it is thus pushed to its final position overlying the plate, to prevent reverse movement of the coil, said means being disengageable by tilting of the free end towards the entrance to the slot, thus to raise the coil over the coil-engaging means.

3. An anchor for engagement by an extension coil spring by movement of the spring, transversely of its axis, bodily towards the anchor, consisting of a plate formed, outside the cylinder defined by the spring, for securement to a support, and bifurcated to receive the trailing side of one coil, as such plate separates the coils during such movement to dispose a part thereof above and a part below the plate, and means on the plate engageable with the rear edge of the leading side of the same coil, when its trailing side is received in the plate's slot, to prevent unintentional reverse or disengaging movement of the spring.

4. An anchor for engagement by an extension coil spring by movement of the spring bodily towards the anchor, transversely of the axis of the spring, comprising a plate disposed to penetrate between two adjoining coils during such movement to dispose one such coil at one side of the plate and the other such coil at the other side, and means formed as an integral part of the plate engageable with the spring, when thus disposed, to prevent unintentional reverse or disengaging movement of the spring.

5. An anchor for engagement by an extension coil spring by movement of the spring bodily towards the anchor, transversely of the axis of the spring, comprising a plate disposed to penetrate between two adjoining coils during such movement to dispose one such coil at one side of the plate and the other such coil at the other side, means formed on the plate and engageable with the spring, when thus disposed, to prevent bodily movement of the spring in a direction transversely to the direction of engaging movement, and means on the plate engageable with the spring, when thus disposed, to prevent unintentional reverse or disengaging movement of the spring.

6. In combination with a coil spring, means to anchor an end thereof comprising a bracket formed along an edge, and outside the cylinder defined by the spring for securement to a support, and insertible between adjacent turns of the spring by relative movement transversely of the length of the spring, and notched on the insertible edge of the plate, to form two fingers, such insertible edge passing beyond the remote side of the spring, and the spring wire interconnecting the adjacent turns of the spring being received in the notch, in the final inserted position of the plate, with one finger at each side of such connecting wire.

ALVA ELMER HOPKINS.